Figure 1:
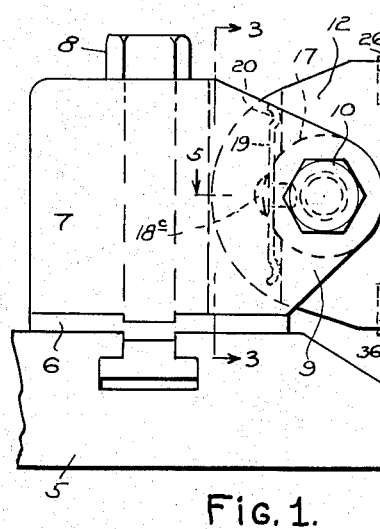

May 22, 1956 — J. R. SMITH — 2,746,332

SHAVING TOOL FOR AUTOMATIC SCREW MACHINES

Filed Feb. 14, 1955

*INVENTOR.*
JOHN R. SMITH,
BY
*ATTORNEY.*

United States Patent Office 2,746,332
Patented May 22, 1956

2,746,332

SHAVING TOOL FOR AUTOMATIC SCREW MACHINES

John R. Smith, Miami, Fla.

Application February 14, 1955, Serial No. 487,829

4 Claims. (Cl. 82—35)

This invention relates to the art of automatic screw machines and embodies particularly certain novel tool holding means for such machines.

The present improvements are especially adapted for use in conjunction with the well known Brown & Sharpe automatic screw machines, though it will be apparent to those skilled in the art that the structure hereinafter disclosed may be readily adapted to other automatic screw machines of the same general class.

An object of the invention has been to provide an improved tool holder involving the use of tools supported in a novel manner for simplicity and accuracy of adjustment and complemented by work supporting members, also quickly and easily adjustable and a special objective achieved by this invention lies in the provisions for the quick adjustment or removal of the said tool or work supporting members and the interchanging of tool members as may be required for different kinds of operations of the automatic screw machine. With the use of the improvements of this invention, the work entailed in adjusting and removing tool blocks or members is greatly reduced by reason of the provisions for the quick adjustment and removal or interchanging of the tool parts by the employment of this invention under practical conditions of service.

A further object of the invention resides in the provision of tool holding means and work supporting means so constructed that the device can be employed on either the front or rear slide of a screw machine, and wherein the tool may engage over or under the work, which may rotate either forwardly or backwardly.

The invention further contemplates tool holders for detachable mounting on the tool posts of automatic screw machines of either the front or back slide, with the mounting means being such that the holders are reversible in a manner to position the cutting tool either over or under the work and on either the front or back slide and embodies novel bushing means cooperating with the conventional clamping bolt of the tool post.

The invention further contemplates a blade shaver that is complemental to a rotatable work supporting roller and with the axial center line of the roller being on the direct line of the cutting edge of the blade.

An outstanding improvement over prior art patents resides in a tool holder having the above mentioned characteristics that is connected to the well known tool post in a manner to permit a vertical swinging action of the tool holder to adjust it to the work piece and with the tool holder being spring loaded and limited in its swinging action.

Detailed novel features of construction and operation of the device will be more clearly defined in the following description, reference being had to the accompanying drawings, wherein has been illustrated a preferred form of the device and wherein like characters of reference are employed to denote like parts throughout.

Figures 2, 3:
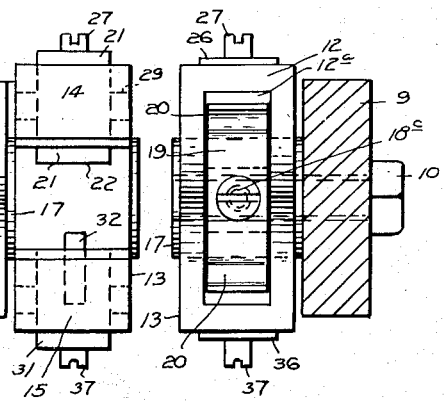
Figure 4:
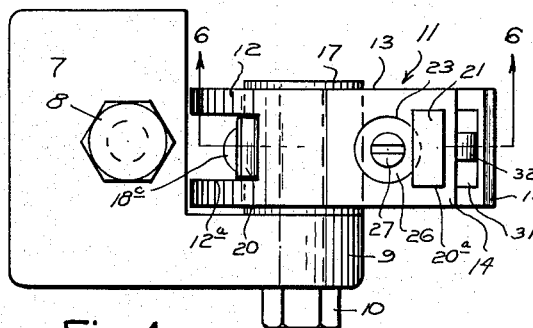
Figure 5:
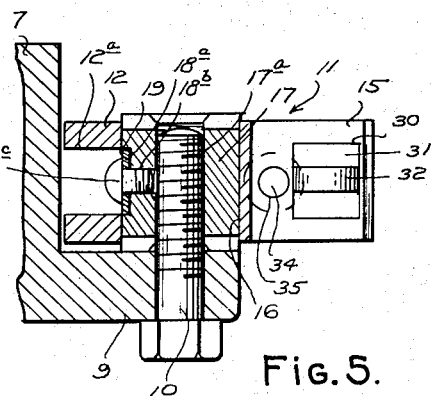
Figure 6:
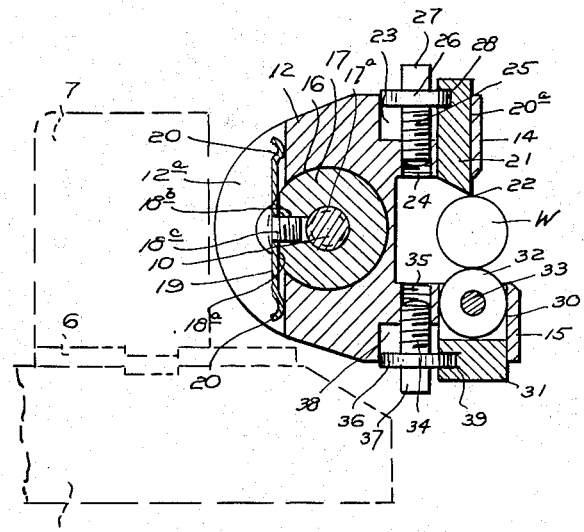
Figure 7:
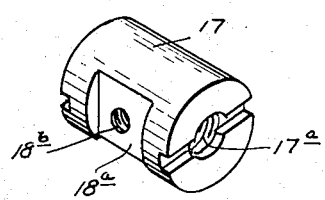

In the drawings:

Figure 1 is a side elevation of a conventional tool post of an automatic screw machine, showing the improved tool holder mounted thereon, Figure 2 is a front elevation thereof, associated with the tool post, Figure 3 is a transverse vertical section, taken on line 3—3 of Figure 1, showing the tool holder in rear elevation, Figure 4 is a top plan view of the device of Figure 1, Figure 5 is a horizontal section, taken on line 5—5 of Figure 1, Figure 6 is a vertical section, taken on line 6—6 of Figure 4, and Figure 7 is a perspective view of a bushing for the support of the tool holder.

Referring specifically to the drawings, the numeral 5 designates a conventional cross slide of an automatic screw machine similar to the well known Brown & Sharpe. The numeral 6 indicates a special raising block substantially half the thickness of the conventional raising block and 7 the conventional tool post, held in adjusted position upon the cross slide by the clamping bolt 8. The tool post 7 is provided with the usual wing extension 9, as is customary and the wing 9 is drilled for the reception of a clamping bolt 10, employed to support the tool holder, indicated as a whole by the numeral 11, to the tool post. The tool post as indicated, may be either the forward or rear tool mounting, since the invention is adaptable to either the forward or rear slide.

The structure is designed as a blade shaver and its primary purpose is to facilitate the shaving of shoulders and straight bodies back of a head where the conventional box tool cannot be employed. It is also a finishing tool used to hold diameters to close tolerances and eliminating second operational work, such as grinding shoulders to the finshed diameters after the piece is dropped off the automatic screw machine.

The tool holder 11 embodies a semi-cylindrical head 12, having flat parallel side walls 13 adapted to be alternately supported closely adjacent to and parallel to the wing 9, determined by the position in which the device is used. The head 12 is provided with upper and lower jaws 14 and 15, spaced apart and parallel with each other. The jaw 15 extends beyond the jaw 14, for a purpose to be described. The jaws are co-extensive in width with the head 12. The jaws are equidistantly spaced above and below the horizontal center line of a concentric cylindrical opening 16, formed transversely through the head for the snug rotative reception of a cylindrical bushing 17, the opposite ends of which project beyond the walls 13 a distance of approximately .007 of an inch. The bushing has been axially drilled and threaded throughout its length as at 17$^a$ for the threaded engagement with the clamping bolt 10 at assembly and serves to rigidly support the bushing against the wing 9 whereby the tool holder may partake of vertical swinging movement. The bushing 17 is further milled upon one side to provide a flat area 18$^a$, and the bushing is further drilled transversely and centrally of the area 18$^a$, as at 18$^b$ and threaded for the reception of a screw 18$^c$, to be later described. The head 12 is vertically slotted at 12$^a$ to a depth partially bisecting the opening 16, shown clearly in Figure 6. The width of the slot 12$^a$ and the milled flattened portion of the bushing 18$^a$ are substantially identical. Fixedly connected in overlying relation to the area 18$^a$ by a screw 18$^c$ is a leaf spring 19, the opposite curled ends 20 of which bear against the bottom of the slot 12$^a$ at points equidistantly spaced above and below the axial center line of the head and the screw 18$^c$. Thus, with the bushing rigidly clamped against the wing 9 by the screw 10, the holder may swing in a vertical plane up or down against the tension of the spring arms and is limited in its swinging action by the abutment of the bottom wall of the slot 12ª against the intermediate portion of the spring. Thus, the tool holder is yieldable in a vertical plane for over-riding engagement with the work piece and is held against shifting along the bushing, since the bushing is rigidly clamped against the wing 9 and with the spring 19 being fixed thereto and extending into the slot 12ª.

The jaw 14, adjacent its outer end, is provided with a vertically arranged rectangular opening 20ª extending entirely therethrough. A blade shaving tool 21, rectangular in cross-section, is adapted to traverse the opening 20ª and in operative position projects below the under face of the jaw. The blade 21 is bevelled upwardly and rearwardly, providing a cutting edge 22. Rearwardly of the opening 20ª, the jaw is provided with a relatively large cylindrical opening 23, extending downwardly from the upper face of the jaw to a depth substantially half the thickness of the jaw. The opening 23 partially bisects the opening 20ª. Concentric to the opening 23 is a threaded cylindrical opening 24, extending through the under face of the jaw. A tool adjusting threaded stud 25, has threaded engagement with the opening 24 and carries adjacent its upper end, a cylindrical collar 26, having a diameter to traverse the opening 23. A slotted head 27 serves to facilitate the rotative adjustment of the stud. The collar 26 engages a slot 28, formed in the rear face of the tool 21 and serves to shift the tool in a vertical plane when the stud is rotated, thus imparting a very fine adjustment to the tool cutting edge 22. Set screws 29 threaded into suitable openings in opposite sides of the jaw 14, serve to rigidly fix the tool 21 after adjustment.

The jaw 15, adjacent its outer end, is provided with a generally square and vertically arranged opening 30, slidably receiving a bifurcated block 31, rotatably supporting a roller 32, upon a cross shaft 33. The roller has a diameter substantially equal to the thickness of the block and projects above the top of the block to serve as a work support and in use, bears against the side of the work at a point diametrically opposite to the point of cutting contact of the tool 21. The forward location of the block 31, positioning the cutting edge 22 of the tool on an exact axial alignment with the roller, is clearly illustrated in Figures 1 and 6. The block 31 is adjustable toward and from the tool 21, under the influence of a threaded stud 34, having threaded engagement in a threaded opening 35 of the jaw 15, that is substantially axially aligned with the opening 24 of the jaw 14. The stud 34 carries a collar 36 and a slotted head 37. The collar has rotative movement in an enlarged cylindrical recess 38, concentric to the opening 35. The collar 36 engages a transverse slot 39, formed in the rear wall of the block 31. It will therefore be apparent that rotative movement of the stud 34 causes the block and its supported roller 32 to move toward or from the tool 21. As clearly shown in Figures 1 and 6, the contacting parts of the tool 21 and the roller 32 are equidistantly spaced above and below the horizontal center line of the head 12, thus placing the work, indicated at W, on a direct center with the tool holder 11. Set screws 40, threaded in suitable threaded openings of the jaw 15, serve to positively lock the block 31 in adjusted position.

The blade shaver so far described can be used in four different positions, that is, on the front slide with the work spindle running forward or backward or on the back slide with the work spindle running forward or backward. This is possible, since the tool can be reversed by removing the clamping bolt 10 for releasing the tool holder bodily, turning the holder upside down and then replacing the clamping bolt 10. Thus, the tool holder is readily reversible so that the cutting edge of the blade 21 will be positioned at all times against the direction of movement of the work spindle. When the tool holder is turned upside down, as when being used on the front slide and the spindle is turning in a clockwise direction, the roller will be on top and the blade below.

In the use of the invention, the diameter of the work is determined and the blade and work supporting roller is adjusted in accordance with the particular cut. Once the device is set in position, all fine adjustments are made from the top, regardless of whether you are using the device with the blade or the roller on top. This greatly facilitates the adjustment and the operator is able to accurately judge the necessary adjustment. After adjustment, the tool is employed in the usual manner. The independent adjustment of both the blade and the roller results in considerable saving of a mechanics time. The blade 21 is readily removed for resharpening and replaced in a minimum of time or a different blade substituted. With the spring 19 and bushing in assembled relation to the tool holder, the parts are obviously held against displacement and the tool holder may be readily removed and replaced without disturbing the relative position of the bushing and the spring. The bushing is preferably slotted at its opposite ends for the reception of a suitable spanner wrench when the bolt 10 is to be loosened.

It will be apparent from the foregoing that a very novel form of blade shaver has been provided. The simplicity of adjustments result in extremely accurate work that has a relatively high finish requiring no further operations. The tool is quickly and easily mounted upon the conventional tool posts in various positions for operation and with a minimum of effort. The extension of the bushing beyond the side walls of the tool holder and the fixed positioning of the spring with respect to the bushing results in a tool holder that is floatingly mounted and spring loaded in a manner that permits the tool holder to be shifted toward the work piece where it will automatically align itself. The maximum yieldable motion of the tool holder is adequate for the alignment to the work and the spring maintains the tool holder in a position at all times for engagement with the work. The parts are simple, being few and easily adjustable, are strong, durable, relatively cheap to manufacture and highly efficient for the purpose described.

It is to be understood that the invention is not limited to the precise arrangement shown, but that changes are contemplated as readily fall within the spirit of the invention as determined by the scope of the subjoined claims.

Having described my invention, what I claim as new and desire to secure by Letters Patent is:

1. A blade shaving tool holder for use upon the tool posts of either the front or back slides of an automatic screw machine, the tool holder embodying a head portion semi-cylindrical in shape and having parallel flat side walls, the head being provided with a concentric transverse cylindrical opening therethrough, a cylindrical bushing engageable within the opening and with the bushing having its opposite ends projecting slightly beyond the flat sides, the bushing provided with an axial threaded opening entirely therethrough for the threaded reception of a clamping bolt passing through the tool post and whereby the bushing is rigidly clamped against the tool post, the tool holder being rockable in a vertical plane upon the bushing, a leaf spring connected with the bushing at one side and upon the center line of the bushing, the leaf spring having oppositely extending arms that bear against the head portion at points equidistantly spaced above and below the center line of the bushing and the head portion whereby to yieldably support the tool holder in a work engaging position, the head adapted to have alternate inverted mounting upon the tool post, the head provided with a pair of forwardly extending parallel and spaced apart jaws, one of the jaws provided with a vertical opening therethrough for the sliding reception of a tool blade, the blade being bevelled at one end to provide a cutting edge, the blade being slotted on one side for engagement by a screw adjustment, the other jaw provided with a vertically arranged square opening therethrough, a roller block vertically shiftable through the last named opening for movement toward and from the blade, a roller carried by the block at a right angle to the blade, the axial center line of the roller being on a vertical alignment with the cutting edge of the blade, the block provided with a slot upon one side for the reception of a screw adjustment device and means whereby the head portion is held against sliding movement with respect to the bushing and whereby the head portion is held in spaced relation to the tool post.

2. The device according to claim 1, wherein the head portion is vertically slotted inwardly from the peripheral end of the head portion and wherein the oppositely extending arms of the spring bear against the bottom of the slot, the spring and its arms having a width corresponding closely to the width of the slot whereby to prevent a longitudinal sliding movement of the tool holder upon the bushing, the bearing ends of the spring arms exerting an identical pressure upon the tool holder at points equidistantly spaced above and below the axial center line of the head portion.

3. The device according to claim 1, wherein the bushing is cut away upon one side to provide a mounting support for a flat leaf spring, the cut-away portion being flat and centrally apertured and threaded transversely of the bushing for the reception of a screw whereby the spring is held with respect to the bushing, the spring having upper and lower arm extensions and with the terminal ends of the arms being curved, the head portion being inwardly slotted from its peripheral end to provide a slot that is vertically disposed with respect to the tool holder, the slot having a width substantially identical with the width of the cut-away side of the bushing, the leaf spring having a width closely approximating the width of the slot, the said slot having a depth whereby it partially bisects the cylindrical opening of the head portion, the terminal ends of the spring bearing against the bottom of the slot at points equidistantly spaced above and below the horizontal center line of the bushing and the cylindrical opening of the head portion whereby to yieldably support the tool holder in a horizontal position for engagement with the work piece.

4. A blade shaver tool holder for detachable and reversible mounting upon either the front or rear slides of automatic screw machines equipped with circular tool posts, the tool holder comprising a head portion and forwardly extending parallel and spaced apart jaws that adjustably receive a blade and a supporting roller for a work piece, the head portion being transversely and cylindrically apertured throughout its width, a cylindrical bushing disposed in the aperture and with the bushing having its opposite ends projecting beyond the sides of the head portion, the bushing being axially bored and threaded throughout its length for the reception of a clamping bolt carried by the tool post whereby the bushing is clamped to the side of the tool post against turning, a spring connected with the bushing and with the spring having oppositely extending arms that bear against the tool holder at points equidistantly spaced above and below the center line of the bushing, the spring engaging the head portion in a manner that prevents sliding of the tool holder with respect to the bushing and whereby the tool holder is rockably held upon the bushing and free of contacting engagement with the tool post, the tool holder being yieldable in a vertical plane whereby its supported tool and roller will accurately engage a work piece.

References Cited in the file of this patent
UNITED STATES PATENTS

| | | |
|---|---|---|
| 1,243,989 | Schulze | Oct. 3, 1917 |
| 2,364,320 | Schlitters | Dec. 5, 1944 |
| 2,412,757 | Smith | Dec. 17, 1946 |
| 2,687,664 | Smith | Aug. 31, 1954 |

FOREIGN PATENTS

| | | |
|---|---|---|
| 56,287 | Germany | May 6, 1891 |
| 615,245 | Germany | July 1, 1935 |